(12) United States Patent
Tallman et al.

(10) Patent No.: US 10,738,622 B2
(45) Date of Patent: Aug. 11, 2020

(54) COMPONENTS HAVING OUTER WALL RECESSES FOR IMPINGEMENT COOLING

(71) Applicant: General Electric Company, Schenectady, NY (US)

(72) Inventors: James Albert Tallman, Glenville, NY (US); Thomas Raymond Farrell, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 627 days.

(21) Appl. No.: 15/232,527

(22) Filed: Aug. 9, 2016

(65) Prior Publication Data

US 2018/0045057 A1    Feb. 15, 2018

(51) Int. Cl.
| | |
|---|---|
| *F01D 5/18* | (2006.01) |
| *F01D 25/12* | (2006.01) |
| *F01D 9/04* | (2006.01) |
| *F02C 3/04* | (2006.01) |
| *F02C 7/12* | (2006.01) |

(52) U.S. Cl.
CPC ............... *F01D 5/187* (2013.01); *F01D 5/18* (2013.01); *F01D 9/041* (2013.01); *F01D 25/12* (2013.01); *F02C 3/04* (2013.01); *F02C 7/12* (2013.01); *F05D 2220/32* (2013.01); *F05D 2250/232* (2013.01); *F05D 2250/75* (2013.01); *F05D 2260/201* (2013.01)

(58) Field of Classification Search
CPC . F01D 5/18; F01D 5/186; F01D 5/187; F01D 5/188; F01D 5/189; F01D 9/041; F01D 25/12; F02C 3/04; F02C 7/12; F02C 7/18; F05D 2220/32; F05D 2250/232; F05D 2250/75; F05D 260/201; F23R 3/002; F23R 3/04

USPC .......................................................... 60/806
See application file for complete search history.

(56) References Cited

U.S. PATENT DOCUMENTS

| | | | |
|---|---|---|---|
| 2,843,354 | A | 7/1958 | Smith |
| 3,700,348 | A | 10/1972 | Corsmeier et al. |
| 3,781,129 | A | 12/1973 | Aspinwall |
| 5,660,524 | A | 8/1997 | Lee et al. |

(Continued)

OTHER PUBLICATIONS

Specification and Figures for U.S. Appl. No. 15/207,743, James Albert Tallman, "Turbomachine Component Having Impingement Heat Transfer Feature, Related Turbomachine and Storage Medium", filed Jul. 12, 2016.

*Primary Examiner* — Mark A Laurenzi
*Assistant Examiner* — Loren C Edwards
(74) *Attorney, Agent, or Firm* — Armstrong Teasdale LLP (57) ABSTRACT

A component configured for impingement cooling includes an inner wall defining a plurality of apertures extending therethrough. Each aperture of the plurality of apertures is configured to emit a cooling fluid therethrough. The component also includes an outer wall that includes an exterior surface, an opposite interior surface, and a thickness defined therebetween. The component further includes a plurality of recesses defined in the outer wall. Each recess of the plurality of recesses extends from a recess first end to an opposite recess second end. The second recess end is defined at the interior surface, and the recess first end is positioned within the outer wall at a depth less than the thickness. Each recess is aligned with a corresponding aperture of the plurality of apertures to receive the cooling fluid therefrom.

20 Claims, 8 Drawing Sheets

(56) References Cited

U.S. PATENT DOCUMENTS

| | | |
|---|---|---|
| 6,902,372 B2 | 6/2005 | Liang |
| 6,974,308 B2 | 12/2005 | Halfmann et al. |
| 7,556,476 B1 | 7/2009 | Liang |
| 8,608,430 B1 | 12/2013 | Liang |
| 8,757,974 B2 | 6/2014 | Propheter-Hinckley et al. |
| 2002/0062945 A1* | 5/2002 | Hocker .................. F01D 5/189 165/53 |
| 2005/0163609 A1* | 7/2005 | Riahi ...................... F01D 5/186 415/115 |
| 2009/0074576 A1 | 3/2009 | Brostmeyer |
| 2011/0189015 A1 | 8/2011 | Shepherd |

* cited by examiner

COMPONENTS HAVING OUTER WALL RECESSES FOR IMPINGEMENT COOLING

BACKGROUND

The field of the disclosure relates generally to components that include internal impingement cooling, and more particularly to components that include an array of recesses on an interior surface of an outer wall to improve impingement cooling and/or spallation mitigation.

Some components, such as hot gas path components of gas turbines, are subjected to high temperatures. At least some such components have internal cooling circuits defined therein, such as but not limited to a network of plenums and passages, that provide impingement of a cooling fluid against an interior surface of the outer wall to maintain the outer wall below a threshold temperature during operation. However, in at least some cases, an effectiveness of such internal impingement cooling is limited by a thickness of the outer wall.

In addition, some such components include a thermal barrier coating on an exterior surface of the outer wall to further protect the outer wall from high temperatures during operation. However, the thermal barrier coating may be spalled or otherwise degraded during high temperature operation, exposing the exterior surface of the component to oxidation in the high temperature environment and, thus, reducing an operational lifetime of the component.

BRIEF DESCRIPTION

In one aspect, a component configured for impingement cooling is provided. The component includes an inner wall defining a plurality of apertures extending therethrough. Each aperture of the plurality of apertures is configured to emit a cooling fluid therethrough. The component also includes an outer wall that includes an exterior surface, an opposite interior surface, and a thickness defined therebetween. The component further includes a plurality of recesses defined in the outer wall. Each recess of the plurality of recesses extends from a recess first end to an opposite recess second end. The recess second end is defined at the interior surface, and the recess first end is positioned within the outer wall at a depth less than the thickness. Each recess is aligned with a corresponding aperture of the plurality of apertures to receive the cooling fluid therefrom.

In another aspect, a rotary machine is provided. The rotary machine includes a combustor section configured to generate combustion gases, and a turbine section configured to receive the combustion gases from the combustor section and produce mechanical rotational energy therefrom. A path of the combustion gases through the rotary machine defines a hot gas path. The rotary machine also includes a component proximate the hot gas path. The component includes an inner wall defining a plurality of apertures extending therethrough. Each aperture of the plurality of apertures is configured to emit a cooling fluid therethrough. The component also includes an outer wall that includes an exterior surface, an opposite interior surface, and a thickness defined therebetween. The component further includes a plurality of recesses defined in the outer wall. Each recess of the plurality of recesses extends from a recess first end to an opposite recess second end. The recess second end is defined at the interior surface, and the recess first end is positioned within the outer wall at a depth less than the thickness. Each recess is aligned with a corresponding aperture of the plurality of apertures to receive the cooling fluid therefrom.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

The exemplary components described herein overcome at least some of the disadvantages associated with known systems for internal impingement cooling of a component. The embodiments described herein include a plurality of recesses defined in an interior surface of an outer wall of the component. Each recess is aligned with a corresponding impingement jet aperture to receive cooling fluid therefrom. The recesses enable the cooling fluid to be received closer to an exterior surface of the outer wall, thereby improving cooling and reducing a potential for spalling or other degradation to a thermal barrier coating on the exterior surface. Moreover, if burn-through of the outer wall occurs to a depth that reaches the recesses, cooling fluid escapes through the recesses in the affected area to provide film cooling of the degraded region, thereby increasing the operational lifetime of the component. In some cases, the recess includes at least one trough leading away from an impingement target within the recess, and the at least one trough directs exhausted cooling fluid away from respective impingement targets of adjacent recesses, thereby reducing interference with adjacent impingement jets.

Figure 1:
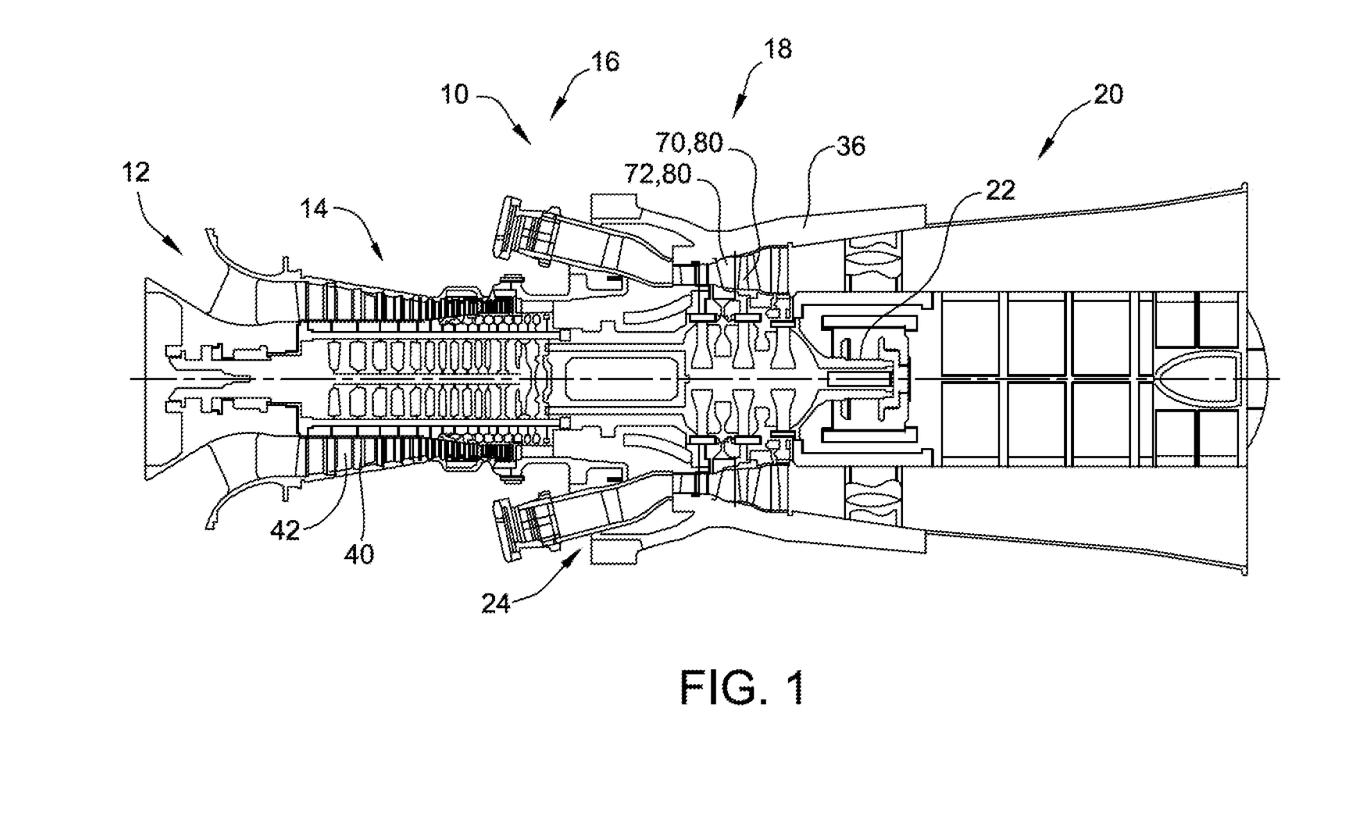
FIG. 1 is a schematic diagram of an exemplary rotary machine.

FIG. 1 is a schematic view of an exemplary rotary machine 10 having components for which embodiments of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any rotary machine for which components formed with internal passages as described herein are suitable. Moreover, although embodiments of the present disclosure are described in the context of a rotary machine for purposes of illustration, it should be understood that the embodiments described herein are applicable in any context that involves a component exposed to a high temperature environment.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor shaft 22 may be coupled to a load (not shown) such as, but not limited to, an electrical generator and/or a mechanical drive application. The exhausted combustion gases flow downstream from turbine section 18 into exhaust section 20. A path of the combustion gases through rotary machine 10 defines a hot gas path of rotary machine 10. Components of rotary machine 10 are designated as components 80. Components 80 proximate the hot gas path are subjected to high temperatures during operation of rotary machine 10. In alternative embodiments, component 80 is any component in any application that is exposed to a high temperature environment.

Figure 2:
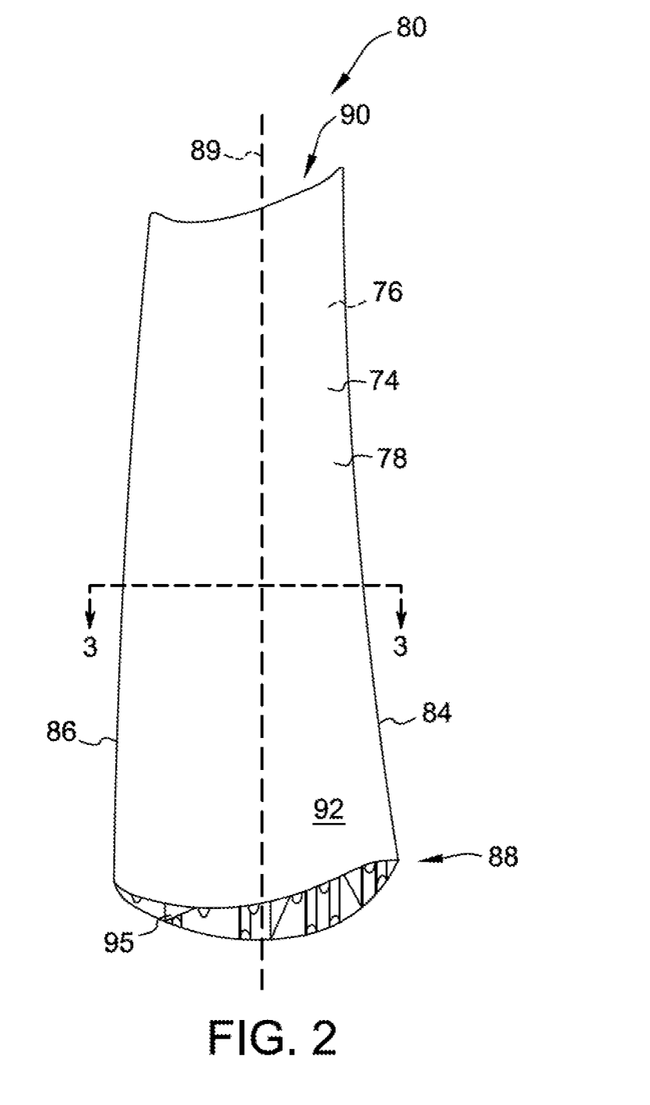
FIG. 2 is a schematic perspective view of an exemplary component for use with the rotary machine shown in FIG. 1.
Figure 3:
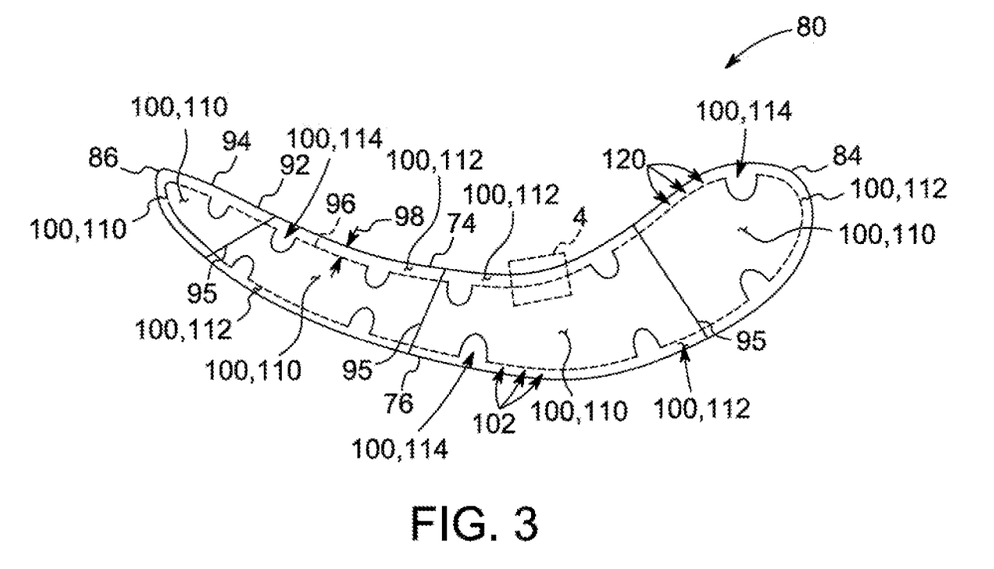
FIG. 3 is a schematic cross-section of the component shown in FIG. 2, taken along lines 3-3 shown in FIG. 2.
Figure 4:
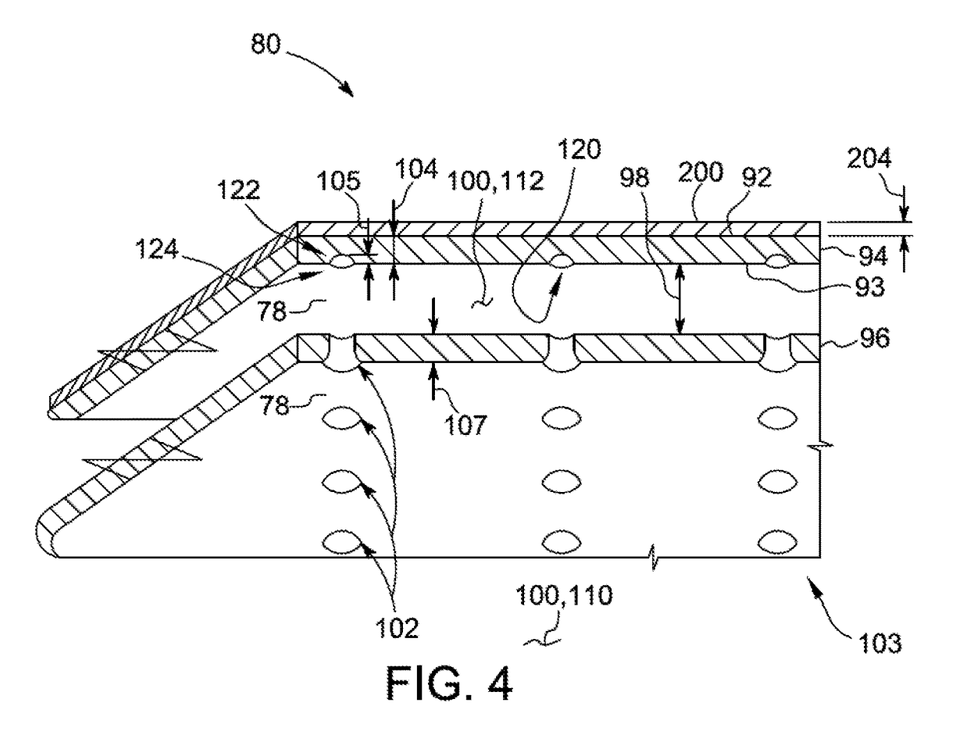
FIG. 4 is a schematic perspective sectional view of a portion of the component shown in FIGS. 2 and 3, designated as portion 4 in FIG. 3.

FIG. 2 is a schematic perspective view of an exemplary component 80, illustrated for use with rotary machine 10 (shown in FIG. 1). FIG. 3 is a schematic cross-section of component 80, taken along lines 3-3 (shown in FIG. 2). FIG. 4 is a schematic perspective sectional view of a portion of component 80, designated as portion 4 in FIG. 3. With reference to FIGS. 2-4, component 80 includes an outer wall 94 having a preselected thickness 104. Moreover, in the exemplary embodiment, component 80 includes at least one internal void 100 defined therein. For example, a cooling fluid is provided to internal void 100 during operation of rotary machine 10 to facilitate maintaining component 80 below a temperature of the hot combustion gases.

Component 80 is formed from a component material 78. In the exemplary embodiment, component material 78 is a suitable nickel-based superalloy. In alternative embodiments, component material 78 is at least one of a cobalt-based superalloy, an iron-based alloy, and a titanium-based alloy. In other alternative embodiments, component material 78 is any suitable material that enables component 80 to function as described herein.

In the exemplary embodiment, component 80 is one of rotor blades 70 or stator vanes 72. In alternative embodiments, component 80 is another suitable component of rotary machine 10. In still other embodiments, component 80 is any component in any application that is exposed to a high temperature environment.

In the exemplary embodiment, rotor blade 70, or alternatively stator vane 72, includes a pressure side 74 and an opposite suction side 76. Each of pressure side 74 and suction side 76 extends from a leading edge 84 to an opposite trailing edge 86. In addition, rotor blade 70, or alternatively stator vane 72, extends from a root end 88 to an opposite tip end 90. A longitudinal axis 89 of component 80 is defined between root end 88 and tip end 90. In alternative embodiments, rotor blade 70, or alternatively stator vane 72, has any suitable configuration that is capable of being formed with a preselected outer wall thickness as described herein.

Outer wall 94 at least partially defines an exterior surface 92 of component 80, and an interior surface 93 opposite exterior surface 92. In the exemplary embodiment, outer wall 94 extends circumferentially between leading edge 84 and trailing edge 86, and also extends longitudinally between root end 88 and tip end 90. In alternative embodiments, outer wall 94 extends to any suitable extent that enables component 80 to function for its intended purpose. Outer wall 94 is formed from component material 78.

In addition, in certain embodiments, component 80 includes an inner wall 96. Inner wall 96 is positioned interiorly to outer wall 94, and the at least one internal void 100 includes at least one plenum 110 that is at least partially defined by inner wall 96 and interior thereto. In the exemplary embodiment, each plenum 110 extends from root end 88 to proximate tip end 90. In alternative embodiments, each plenum 110 extends within component 80 in any suitable fashion, and to any suitable extent, that enables component 80 to function as described herein. In the exemplary embodiment, the at least one plenum 110 includes a plurality of plenums 110, each defined by inner wall 96 and at least one partition wall 95 that extends at least partially between pressure side 74 and suction side 76. For example, in the illustrated embodiment, each partition wall 95 extends from outer wall 94 of pressure side 74 to outer wall 94 of suction side 76. In alternative embodiments, at least one partition wall 95 extends from inner wall 96 of pressure side 74 to inner wall 96 of suction side 76. Additionally or alternatively, at least one partition wall 95 extends from inner wall 96 to outer wall 94 of pressure side 74, and/or from inner wall 96 to outer wall 94 of suction side 76. In other alternative embodiments, the at least one internal void 100 includes any suitable number of plenums 110 defined in any suitable fashion. Inner wall 96 is formed from component material 78.

Moreover, in some embodiments, at least a portion of inner wall 96 extends circumferentially and longitudinally adjacent at least a portion of outer wall 94 and is separated therefrom by an offset distance 98, such that the at least one internal void 100 also includes at least one chamber 112 defined between inner wall 96 and outer wall 94. In the exemplary embodiment, the at least one chamber 112 includes a plurality of chambers 112 each defined by outer wall 94, inner wall 96, and at least one partition wall 95. In alternative embodiments, the at least one chamber 112 includes any suitable number of chambers 112 defined in any suitable fashion. In the exemplary embodiment, inner wall 96 defines a plurality of apertures 102 extending therethrough, such that each chamber 112 is in flow communication with at least one plenum 110.

In the exemplary embodiment, offset distance 98 is selected to facilitate effective impingement cooling of outer wall 94 by cooling fluid supplied through plenums 110 and emitted through apertures 102 defined in inner wall 96 towards interior surface 93 of outer wall 94. For example, but not by way of limitation, offset distance 98 varies circumferentially and/or longitudinally along component 80 to facilitate local cooling requirements along respective portions of outer wall 94. In alternative embodiments, offset distance 98 is selected in any suitable fashion. Also in the exemplary embodiment, apertures 102 are arranged in a pattern 103 selected to facilitate effective impingement cooling of outer wall 94. For example, but not by way of limitation, pattern 103 varies circumferentially and/or longitudinally along component 80 to facilitate local cooling requirements along respective portions of outer wall 94. In alternative embodiments, pattern 103 is selected in any suitable fashion.

In some embodiments, apertures 102 are each sized and shaped to emit cooling therethrough in a jet towards interior surface 93. For example, apertures 102 each have a substantially circular or ovoid cross-section. In alternative embodiments, apertures 102 each have any suitable shape and size that enables apertures 102 to be function as described herein.

In the exemplary embodiment, inner wall 96 and partition walls 95 define at least part of a skeletal structure of component 80 that substantially carries an operational load of component 80, while outer wall 94 is integral with inner wall 96 and/or partition walls 95, but carries very little loading. For example, a thickness 107 of inner wall 96 and/or a thickness (not numbered) of partition walls 95 is selected to facilitate load bearing. In alternative embodiments, the thickness of inner wall 96 and/or partition walls 95 is selected in any suitable fashion.

Also in the exemplary embodiment, outer wall 94 defines a boundary between component 80 and the hot gas environment, and has a very small thickness 104 selected to facilitate effective cooling of outer wall 94 with a reduced amount of cooling fluid flow as compared to components having thicker outer walls. In alternative embodiments, outer wall thickness 104 is any suitable thickness that enables component 80 to function for its intended purpose. In certain embodiments, outer wall thickness 104 varies along outer wall 94. In alternative embodiments, outer wall thickness 104 is constant along outer wall 94.

In certain embodiments, the at least one internal void 100 further includes at least one return channel 114 in flow communication with at least one chamber 112, such that each return channel 114 provides a return fluid flow path for fluid used for impingement cooling of outer wall 94. For example, in the exemplary embodiment, each return channel 114 is at least partially defined by inner wall 96. Also in the exemplary embodiment, each return channel 114 extends from root end 88 to proximate tip end 90. In alternative embodiments, each return channel 114 extends within component 80 in any suitable fashion, and to any suitable extent, that enables component 80 to function as described herein. In the exemplary embodiment, the at least one return channel 114 includes a plurality of return channels 114, each defined by inner wall 96 adjacent one of chambers 112. In alternative embodiments, the at least one return channel 114 includes any suitable number of return channels 114 defined in any suitable fashion. In other alternative embodiments, component 80 does not include any return channels 114. For example, outer wall 94 also includes openings extending therethrough (not shown) that channel fluid from chambers 112 therethrough to provide film cooling of an exterior of outer wall 94.

Although the at least one internal void 100 is illustrated as including plenums 110, chambers 112, and return channels 114 for use in cooling component 80 that is one of rotor blades 70 or stator vanes 72, it should be understood that in alternative embodiments, component 80 is any suitable component for any suitable application, and includes any suitable number, type, and arrangement of internal voids 100 that enable component 80 to function for its intended purpose.

In the exemplary embodiment, component 80 further includes a coating 200 coupled adjacent exterior surface 92 of outer wall 94. Coating 200 is formed from at least one material selected to protect outer wall 94 from the high temperature environment. For example, thermal barrier coating 200 includes a suitable bond coat layer adjacent to, and configured to adhere to, exterior surface 92, and a suitable thermal barrier outer layer adjacent to the bond coat layer. In alternative embodiments, coating 200 is formed from any suitable material. Coating 200 has a thickness 204.

Outer wall 94 includes a plurality of recesses 120 defined therein. Recesses 120 each extend, in a direction generally normal to surface 93, from a first end 122 to an opposite second end 124. Second end 124 is defined at interior surface 93, while first end 122 is positioned within outer wall 94 at a depth 105 from interior surface 93, such that depth 105 is less than outer wall thickness 104. Recesses 120 are disposed in outer wall 94 such that each recess 120 is aligned with an aperture 102. More specifically, each recess 120 is positioned to receive a jet of cooling fluid from a corresponding aperture 102 during operation. Recesses 120 having depth 105 defined in outer wall 94 thus cause the cooling fluid to impinge outer wall 94 at a location closer to exterior surface 92 and coating 200.

For example, during operation, cooling fluid is supplied to plenums 110 through root end 88 of component 80. As the cooling fluid flows generally towards tip end 90, portions of the cooling fluid are forced through apertures 102 into chambers 112 and impinge upon corresponding recesses 120 defined in interior surface 93 of outer wall 94. In certain embodiments, impinging the cooling fluid in recesses 120, closer to exterior surface 92 and coating 200, improves a cooling of outer wall 94 and facilitates reducing a probability of spallation or other degradation to coating 200. In the exemplary embodiment, the used cooling fluid then flows into return channels 114 and flows generally toward root end 88 and out of component 80. In some such embodiments, the arrangement of the at least one plenum 110, the at least one chamber 112, and the at least one return channel 114 forms a portion of a cooling circuit of rotary machine 10, such that used cooling fluid is returned to a working fluid flow through rotary machine 10 upstream of combustor section 16 (shown in FIG. 1). Although impingement flow through plenums 110 and chambers 112 and return flow through channels 114 is described in terms of embodiments in which component 80 is rotor blade 70 and/or stator vane 72, a circuit of plenums 110, chambers 112, and return channels 114 is suitable for any component 80 of rotary machine 10, and additionally for any suitable component 80 for any other application suitable for closed circuit fluid flow through a component. Such embodiments provide an improved operating efficiency for rotary machine 10 as compared to cooling systems that exhaust used cooling fluid directly from component 80 into the working fluid within turbine section 18.

In alternative embodiments, the at least one internal void 100 does not include return channels 114. For example, but not by way of limitation, in addition to recesses 120, outer wall 94 includes predefined openings (not shown) extending completely therethrough, and the cooling fluid is exhausted into the working fluid through the outer wall openings to facilitate film cooling of exterior surface 92. In other alternative embodiments, component 80 includes both return channels 114 and predefined openings (not shown) extending through outer wall 94, a first portion of the cooling fluid is returned to a working fluid flow through rotary machine 10 upstream of combustor section 16 (shown in FIG. 1), and a second portion of the cooling fluid is exhausted into the working fluid through the outer wall openings to facilitate film cooling of exterior surface 92.

Figure 5:
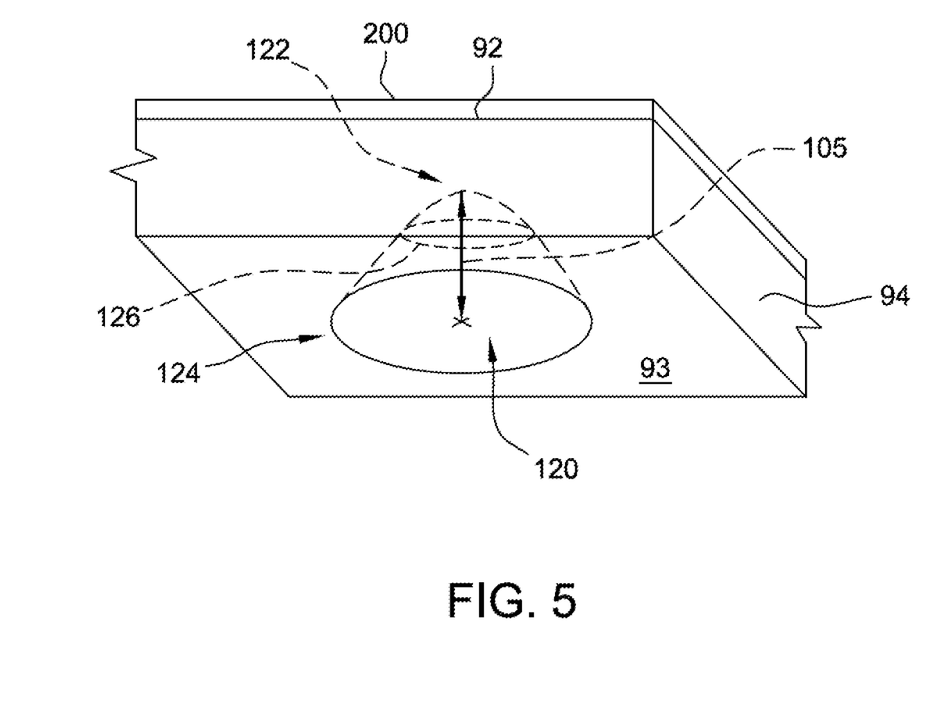
FIG. 5 is a perspective view of a first exemplary recess defined in an outer wall of the component shown in FIGS. 2 and 3.

FIG. 5 is a perspective view of a first exemplary recess 120 defined in outer wall 94 of component 80. A cross-sectional area 126 of recess 120 is defined normal to depth 105. In certain embodiments, cross sectional area 126 generally increases between first end 122 and second end 124. For example, in the exemplary embodiment, recess 120 defines a generally frusto-conical shape within outer wall 94, such that a generally circular cross-sectional area 126 increases between first end 122 and second end 124. In alternative embodiments, each recess 120 defines any suitable shape that enables recess 120 to function as described herein.

Figure 6:
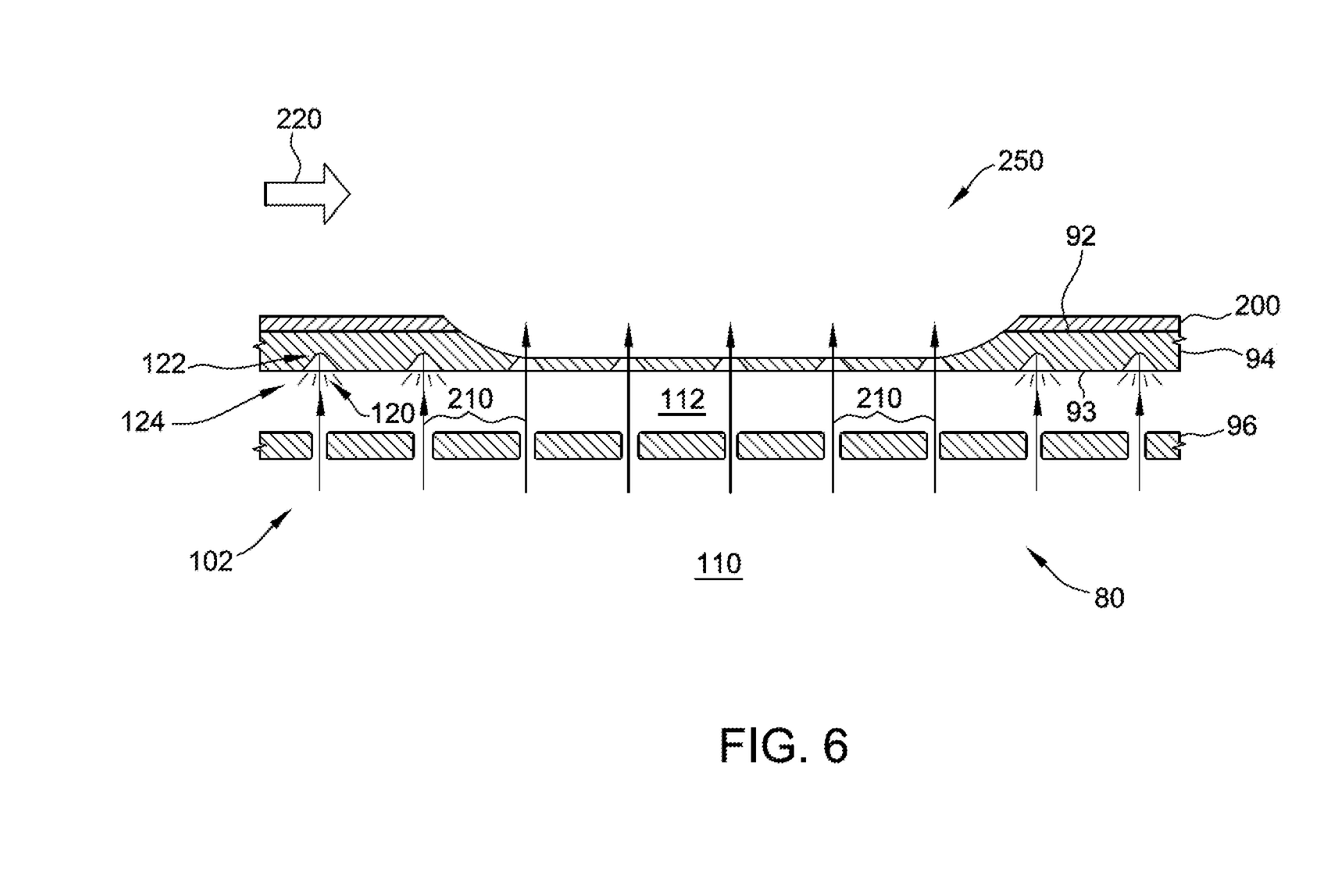
FIG. 6 is a sectional view of the component shown in FIG. 5, including an exemplary spalled region.

FIG. 6 is a sectional view of component 80 including an exemplary spalled region 250. For example, region 250 is created when coating 200 is spalled or otherwise degraded by a high temperature environment, and a portion of exterior surface 92 of outer wall 94 has oxidized, or "burned through," to a depth beyond first end 122 of at least one recess 120. Such recesses 120 thus enter into flow communication with hot gas 220 exterior to outer wall 94. More specifically, a portion of cooling fluid 210 forced through apertures 102 of inner wall 96 towards recesses 120 within spalled region 250 travels completely through outer wall 94. In some embodiments, the escaped cooling fluid 210 provides film cooling over spalled region 250, facilitating reduction or elimination of any further burn-through and, thus, facilitating an improved operating lifetime of component 80. In addition, in embodiments in which cross sectional area 126 generally increases between first end 122 and second end 124 (shown in FIG. 5), an increasing amount of oxidation of outer wall 94 from exterior surface 92 towards interior surface 93 tends to correspondingly increase the exposed cross-sectional area of recesses 120 in spalled region 250, thereby increasing the escape of cooling fluid 210 through the exposed recesses 120 and enhancing the film cooling effect. In some such embodiments, a shape of recesses 120 is preselected to provide a varying cross-sectional area 126 that automatically "tunes" the amount of film cooling provided in response to a severity (e.g., width or depth) of the degradation to outer wall 94. For example, as material burns away from exterior surface 92, cross-sectional area 126 opens larger and larger until enough cooling flow is being emitted from exposed recesses 120 to stop any further burn-through of the outer wall material. Cooling fluid 210 emitted from apertures 102 not located under spalled region 250 generally continues to impinge on first end 122 of corresponding recesses 120.

Figure 7:
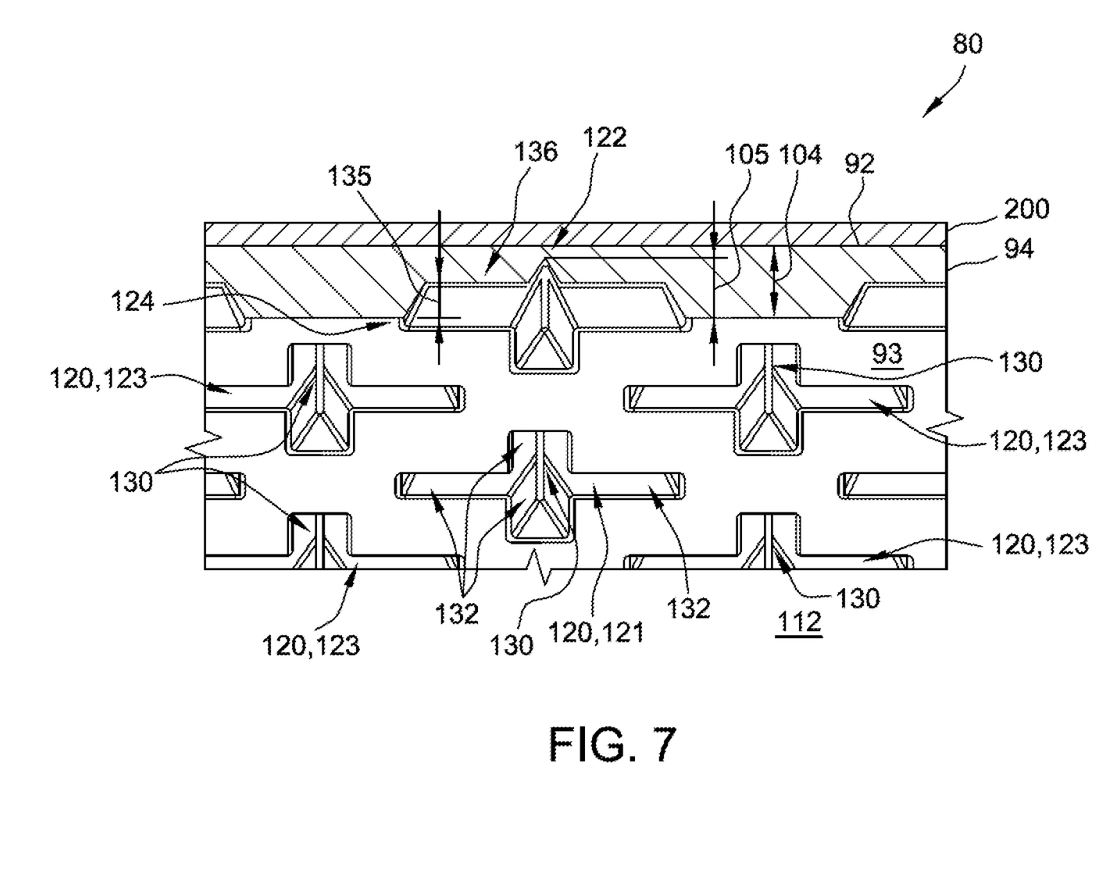
FIG. 7 is a perspective view of a portion of the outer wall of the component shown in FIGS. 2 and 3, including a second exemplary embodiment of recesses defined therein.

In certain embodiments, a shape of recesses 120 is at least partially selected to augment an impingement heat transfer coefficient of impingement jets of cooling fluid 210. For example, FIG. 7 is a perspective view of a portion of outer wall 94 including a second exemplary embodiment of recesses 120 defined therein. In the illustrated embodiment, each recess 120 includes an impingement point 130 aligned with a corresponding aperture 102 in pattern 103 (shown in FIG. 4), such that the cooling fluid emitted from each aperture 102 is directed towards the corresponding impingement point 130. In the exemplary embodiment, each impingement point 130 is positioned at first end 122 of recess 120. In alternative embodiments, at least one recess 120 includes impingement point 130 located other than at first end 122.

Further in the illustrated embodiment, each recess 120 includes at least one trough 132 extending within outer wall 94 from second end 124 to a trough first end 136, and extending away from impingement point 130 along interior surface 93. Troughs 132 are in flow communication with impingement point 130 and chamber 112, and are oriented to direct the cooling fluid received at impingement point 130 away from adjacent impingement points 130. For example, in the illustrated embodiment, the at least one trough 132 of each recess 120 includes four troughs 132 arranged in a cross pattern centered on impingement point 130, with each trough oriented to direct exhausted cooling fluid between, rather than towards, respective impingement points 130 of adjacent recesses 120. More specifically, designating one of the recesses 120 as a first recess 121, troughs 132 are oriented to direct exhausted cooling fluid from impingement point 130 of first recess 121 away from respective impingement points 130 of adjacent recesses 123. Orienting troughs 132 to direct the exhausted cooling fluid away from impingement points 130 of adjacent recesses 123 reduces an interference of the exhausted cooling fluid with the impingement jets directed at impingement points 130 of adjacent recesses 123, thereby improving the impingement heat transfer coefficient of the adjacent impingement jets.

A trough depth 135 is defined between trough first end 136 and recess second end 124, such that trough depth 135 is less than outer wall thickness 104. In the exemplary embodiment, trough depth 135 is less than recess depth 105. In alternative embodiments, trough depth 135 is equal to and/or defines recess depth 105, such that trough first end 136 defines recess first end 122. In certain embodiments, each recess 120 again defines a cross-sectional area normal to depth 105 that generally increases between first end 122 and second end 124. For example, in some such embodiments, a cross-sectional area of each trough, defined normal to depth 105, generally increases between trough first end 136 and recess second end 124. In particular, in the illustrated embodiment, each trough 132 defines an inverted V-shape extending from interior surface 93 into outer wall 94, such that the cross-sectional area of each trough, defined normal to depth 105, correspondingly increases between trough first end 136 and recess second end 124. In alternative embodiments, each trough 132 defines any suitable shape that enables recess 120 to function as described herein.

Figure 8:
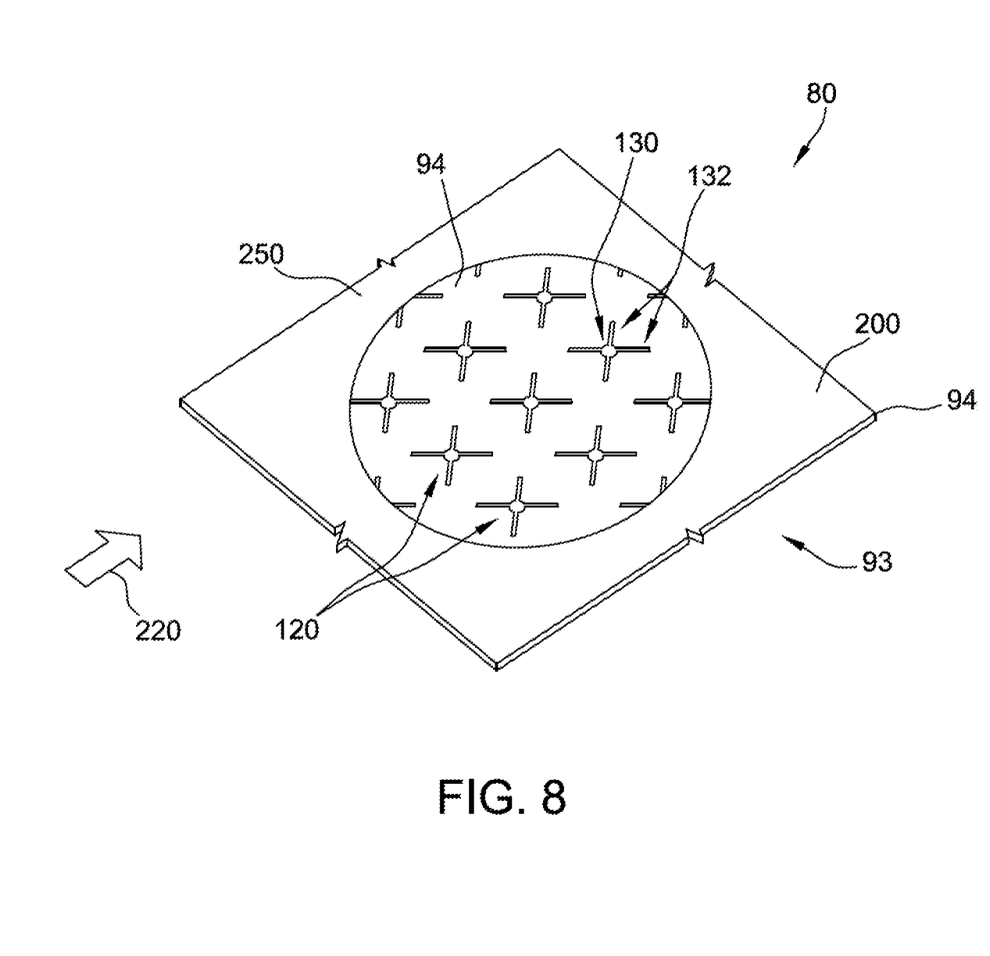
FIG. 8 is a perspective view of a spalled region of the outer wall shown in FIG. 7.

FIG. 8 is a perspective view of a spalled region 250 of outer wall 94 shown in FIG. 7, in which a portion of exterior surface 92 of outer wall 94 has oxidized, or "burned through," to a depth beyond first end 122 and beyond trough first end 136 of some recesses 120. Dimple-shaped impingement point 130 and a relatively small cross-section of troughs 132 are exposed to hot gas 220 exterior to outer wall 94, such that the corresponding impingement jets flow through outer wall 94 to provide film cooling proximate spalled region 250. Once again, an increasing amount of oxidation of outer wall 94 from exterior surface 92 towards interior surface 93 tends to correspondingly increase the exposed cross-sectional area of recesses 120 in spalled region 250, thereby increasing the escape of cooling fluid through the exposed recesses 120 and enhancing the film cooling effect.

Figure 9:
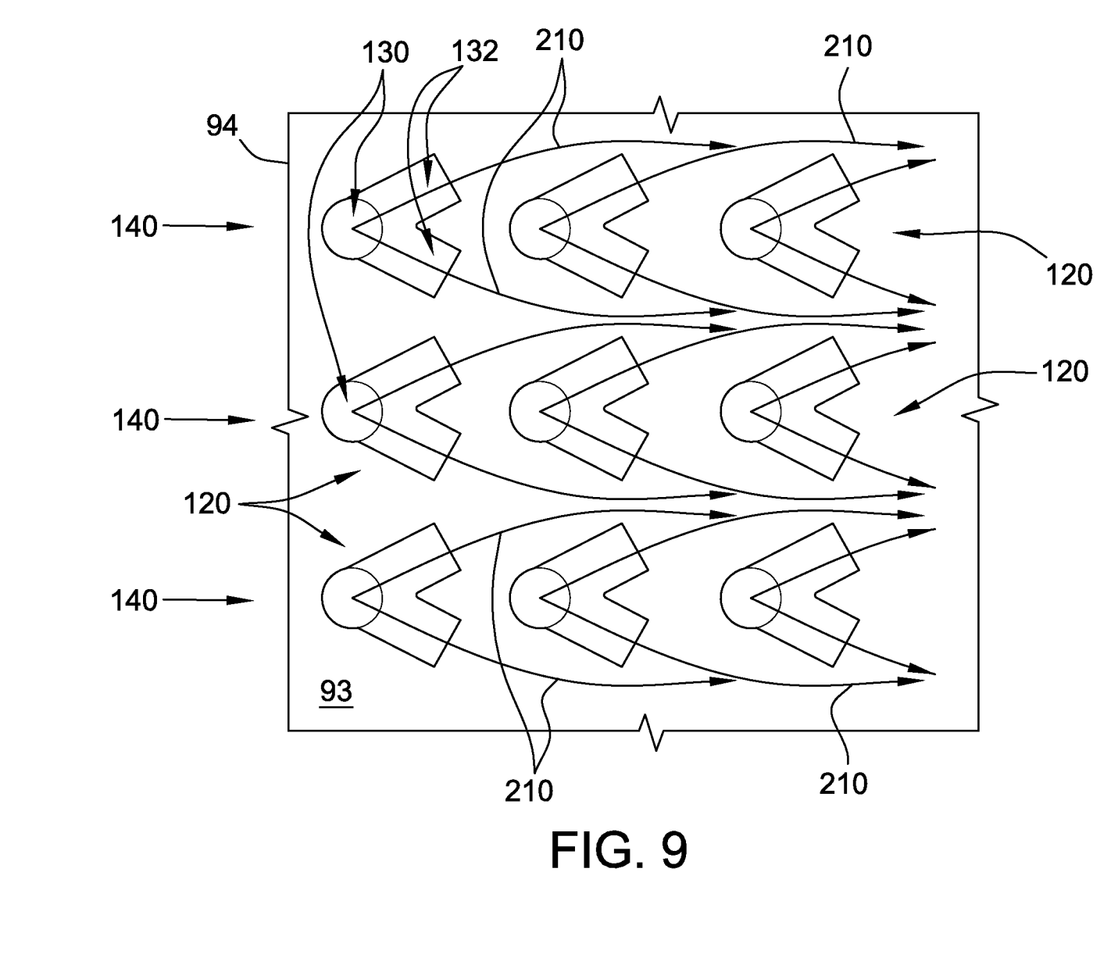
FIG. 9 is a plan view of an interior surface of a portion of the outer wall of the component shown in FIGS. 2 and 3, including a third exemplary embodiment of recesses defined therein.

As an additional non-limiting example, FIG. 9 is a plan view of interior surface 93 of a portion of outer wall 94 including a third exemplary embodiment of recesses 120 defined therein. In the illustrated embodiment, the at least one trough 132 of each recess 120 includes two troughs 132 arranged in a "half-X" pattern emanating from impingement point 130, with each trough oriented to direct exhausted cooling fluid 210 away from, rather than towards, respective impingement points 130 of adjacent recesses 120, thereby further improving the impingement heat transfer coefficient of the adjacent impingement jets. Moreover, in the illustrated embodiment, troughs 132 are oriented such that exhausted cooling fluid 210 from each row 140 of recesses 120 interacts with exhausted cooling fluid from adjacent rows 140 of recesses 120 to continue to channel the exhausted cooling fluid 210 between adjacent rows 140 of recesses 120, further reducing an interference of the exhausted cooling fluid 210 with the impingement jets directed at impingement points 130 of adjacent recesses 120, thereby further improving the impingement heat transfer coefficient of the adjacent impingement jets.

In alternative embodiments, each recess 120 includes any suitable number of troughs 132 arranged in any suitable pattern.

In the exemplary embodiment, recesses 120 are formed integrally within outer wall 94. For example, but not by way of limitation, component 80 is at least partially formed by casting in a mold, and a ceramic core positioned within the mold to define interior surface 93 includes projections shaped to complementarily form recesses 120 within cast outer wall 94. For another example, but not by way of limitation, component 80 is at least partially formed by a suitable additive manufacturing process, in which outer wall 94 having recesses 120 defined therein is "printed" layer by layer. In alternative embodiments, outer wall 94 is initially formed without recesses 120, and recesses 120 are added to outer wall 94 in a subsequent process such as, but not limited to, mechanical drilling, electric discharge machining, or laser drilling. In other alternative embodiments, recesses 120 are formed within outer wall 94 in any suitable fashion that enables recesses 120 to function as described herein.

The above-described embodiments enable improved internal impingement cooling of components, and improved mitigation of spalling or other degradation of exterior surfaces of components, as compared to at least some known impingement cooling systems. Specifically, the embodiments described herein include a plurality of recesses defined in an interior surface of an outer wall of the component. Each recess is aligned with a corresponding impingement jet aperture to receive cooling fluid therefrom. The recesses enable the cooling fluid to be received closer to an exterior surface of the outer wall, thereby improving cooling and reducing a potential for spalling or other degradation of a thermal barrier coating on the exterior surface. Also specifically, if burn-through of the outer wall occurs to a depth that reaches the recesses, cooling fluid escapes through the recesses in the affected area to provide film cooling of the degraded region, thereby increasing the operational lifetime of the component. In some cases, a cross-sectional area of each recess generally increases between a first end proximate the exterior surface and a second end at the interior surface, such that an increasing amount of oxidation of the outer wall from the exterior surface tends to increase the exposed cross-sectional area of the recesses, thereby increasing the escape of cooling fluid through the exposed recesses and enhancing the film cooling effect. Additionally or alternatively, in some cases, the recess includes at least one trough leading away from an impingement target within the recess, and the at least one trough directs exhausted cooling fluid away from respective impingement targets of adjacent recesses, thereby reducing interference with adjacent impingement jets and improving an impingement heat transfer coefficient of the component cooling system.

An exemplary technical effect of the methods, systems, and apparatus described herein includes at least one of: (a) reducing or eliminating spalling or other degradation of a thermal barrier coating on the exterior surface of an internally impingement-cooled component; (b) mitigating oxidation or "burn through" of an outer wall of an internally impingement-cooled component; (c) automatically "tuning" an amount of film cooling provided in response to a degree of degradation of the outer wall of an internally impingement-cooled component; and (d) improving an impingement heat transfer coefficient of the component cooling system.

Exemplary embodiments of internally impingement-cooled components are described above in detail. The components, and methods and systems using such components, are not limited to the specific embodiments described herein, but rather, components of systems and/or steps of the methods may be utilized independently and separately from other components and/or steps described herein. For example, the exemplary embodiments can be implemented and utilized in connection with many other applications that are currently configured to use components in high temperature environments.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A component configured for impingement cooling, said component comprising:
   an inner wall defining a plurality of apertures extending therethrough, each aperture of said plurality of apertures configured to emit a cooling fluid therethrough;
   an outer wall comprising an exterior surface, an opposite interior surface, and a thickness defined therebetween;
   a plurality of recesses defined in said outer wall, each recess of said plurality of recesses extending from a recess first end to an opposite recess second end, wherein said recess second end is defined at said interior surface and said recess first end is positioned within said outer wall at a depth less than said thickness, wherein said each recess is aligned with a corresponding aperture of said plurality of apertures to receive the cooling fluid therefrom; and
   a plurality of troughs, wherein each of said plurality of troughs extends radially outward from one of the plurality of recesses within said outer wall and from said recess second end to a first trough end, each of said plurality of troughs oriented to direct the cooling fluid received at said each recess by preventing the cooling fluid from flowing towards adjacent recesses of said plurality of recesses with respect to said interior surface.

2. The component of claim 1, further comprising at least one plenum that is at least partially defined by said inner wall and interior thereto, said at least one plenum configured to supply the cooling fluid to said apertures.

3. The component of claim 1, further comprising:
   at least one chamber defined between said inner wall and said outer wall; and
   at least one return channel in flow communication with said at least one chamber, such that said at least one return channel provides a return flow path for the cooling fluid.

4. The component of claim 1, further comprising a coating coupled adjacent said exterior surface.

5. The component of claim 1, wherein a cross-sectional area of said each recess is defined normal to said depth, said cross-sectional area increases between said recess first end and said recess second end.

6. The component of claim 1, wherein said each recess comprises an impingement point aligned with said corresponding aperture such that the cooling fluid emitted from said corresponding aperture is directed towards said impingement point.

7. The component of claim 6, wherein each of said plurality of troughs is in flow communication with said impingement point.

8. The component of claim 7, wherein a cross-sectional area of each of said plurality of troughs, defined normal to said depth, increases between said trough first end and said recess second end.

9. The component of claim 7, wherein at least two of said plurality of troughs define an inverted V-shape extending from said interior surface into said outer wall.

10. The component of claim 7, wherein at least two of said plurality of troughs define:
    a cross pattern centered on said impingement point, and
    a half-X pattern emanating from said impingement point.

11. A rotary machine comprising:
    a combustor section configured to generate combustion gases;
    a turbine section configured to receive the combustion gases from said combustor section and produce mechanical rotational energy therefrom, wherein a path of the combustion gases through said rotary machine defines a hot gas path; and
    a component proximate said hot gas path, said component comprising:
       an inner wall defining a plurality of apertures extending therethrough, each aperture of said plurality of apertures configured to emit a cooling fluid therethrough;
       an outer wall comprising an exterior surface, an opposite interior surface, and a thickness defined therebetween; and
       a plurality of recesses defined in said outer wall, each recess of said plurality of recesses extending from a recess first end to an opposite recess second end, wherein said recess second end is defined at said interior surface and said recess first end is positioned within said outer wall at a depth less than said thickness, wherein said each recess is aligned with a corresponding aperture of said plurality of apertures to receive the cooling fluid therefrom;
       a plurality of troughs, wherein each of said plurality of troughs extends radially outward from one of the plurality of recesses within said outer wall and from said recess second end to a first trough end, each of said plurality of troughs oriented to direct the cooling fluid received at said each recess by preventing the cooling fluid from flowing towards adjacent recesses of said plurality of recesses with respect to said interior surface.

12. The rotary machine of claim 11, wherein said component further comprises at least one plenum that is at least partially defined by said inner wall and interior thereto, said at least one plenum configured to supply the cooling fluid to said apertures.

13. The rotary machine of claim 11, wherein said component further comprises:
    at least one chamber defined between said inner wall and said outer wall; and
    at least one return channel in flow communication with said at least one chamber, such that said at least one return channel provides a return flow path for the cooling fluid.

14. The rotary machine of claim 11, wherein said component further comprises a coating coupled adjacent said exterior surface.

15. The rotary machine of claim 11, wherein a cross-sectional area of said each recess is defined normal to said depth, said cross-sectional area increases between said recess first end and said recess second end.

16. The rotary machine of claim 11, wherein said each recess comprises an impingement point aligned with said corresponding aperture such that the cooling fluid emitted from said corresponding aperture is directed towards said impingement point.

17. The rotary machine of claim 16, wherein each of said plurality of troughs is in flow communication with said impingement point.

18. The rotary machine of claim 17, wherein a cross-sectional area of each of said plurality of troughs, defined normal to said depth, increases between said trough first end and said recess second end.

19. The rotary machine of claim 17, wherein at least two of said plurality of troughs define an inverted V-shape extending from said interior surface into said outer wall.

20. The rotary machine of claim 17, wherein at least two of said plurality of troughs define:
    a cross pattern centered on said impingement point, and
    a half-X pattern emanating from said impingement point.

* * * * *